(No Model.) 2 Sheets—Sheet 2.

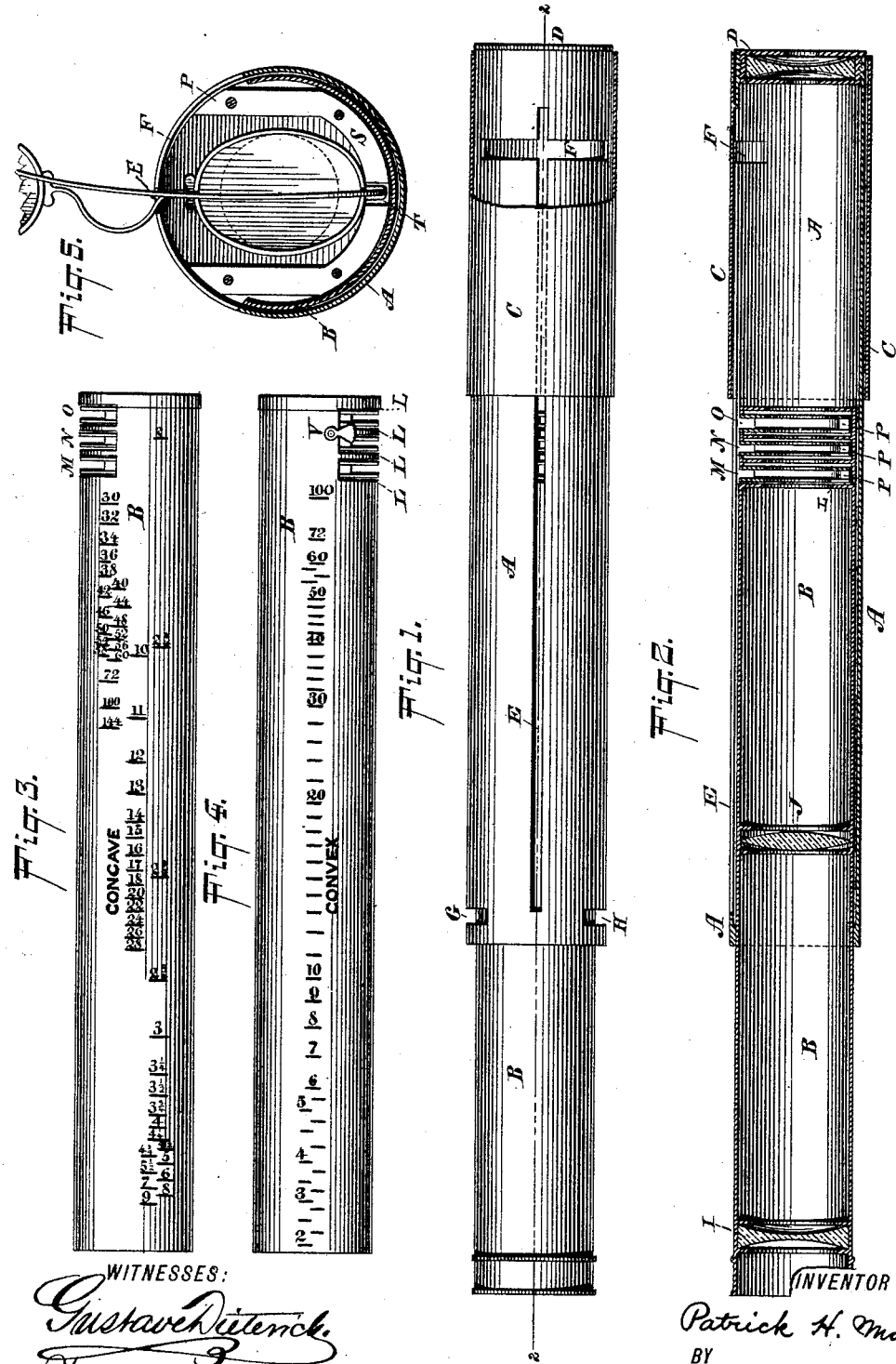

P. H. MAGUIRE.
FOCIMETER.

No. 439,732. Patented Nov. 4, 1890.

WITNESSES:
Gustave Dieterich
William Goebel

INVENTOR
Patrick H. Maguire,
BY
Chas. C. Gill
ATTORNEY.

UNITED STATES PATENT OFFICE.

PATRICK H. MAGUIRE, OF NEW YORK, N. Y.

FOCIMETER.

SPECIFICATION forming part of Letters Patent No. 439,732, dated November 4, 1890.

Application filed June 10, 1890. Serial No. 354,893. (No model.)

*To all whom it may concern:*

Be it known that I, PATRICK H. MAGUIRE, a citizen of the United States, and a resident of New York, in the county of New York and State of New York, have invented certain new and useful Improvements in Focimeters, of which the following is a specification.

The invention relates to improvements in focimeters; and it consists substantially of an apparatus embodying an outer tube having at one end a double-concave lens or eye-piece and an inner sliding tube having at its inner end suitable pockets to receive the lenses to be tested, and at its outer end a double-concave lens, while at about the center of said inner tube is provided a double-convex lens, and upon the opposite sides of the exterior surface of said tube are scales for determining the focus or strength of the convex and concave lenses placed in said pockets. The outer tube is provided near its eye-piece with a transverse slot to admit the lenses to the pockets of the inner tube, and this transverse slot opens into a narrow longitudinal slot cut in the outer tube to receive the frames of the spectacles or eyeglasses and permit their movement during the sliding of the inner tube to adjust the focus of the lens. In opposite sides of the outer tube and adjacent to its outer end are cut transverse elongated apertures, through which the figures on the indicating-scales are visible during the adjusting of the inner tube to determine the strength or focus of the lens being tested, the figure appearing in said apertures at the time the object or landscape may be plainest seen through the tubes denoting the strength or focus of the lens. One of said elongated apertures is provided for use in connection with the scale for convex lenses and the other for use in conjunction with the scale for concave lenses.

The focimeter is adapted for testing the strength or focus of either convex or concave lenses, whether with or without frames.

Figure 8:
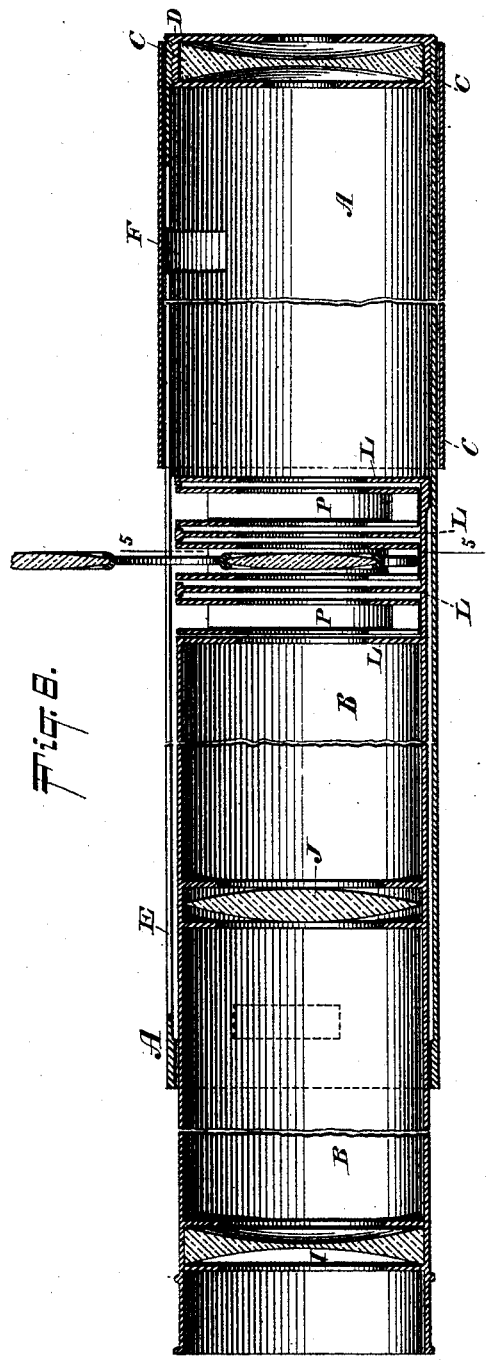
Figure 9:
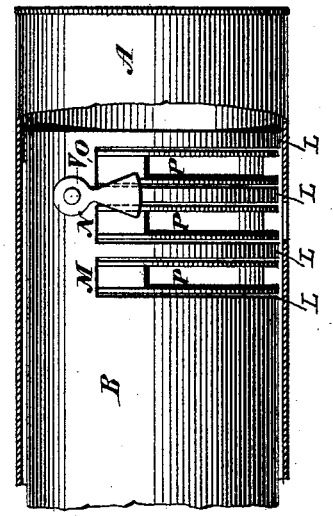
Figures 6, 10:
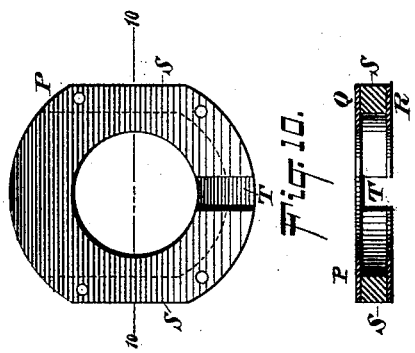
Figure 7:
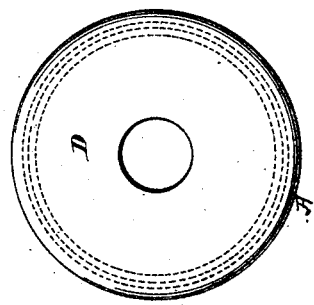

Referring to the accompanying drawings, Figure 1 is a side elevation, partly in section, of a focimeter constructed in accordance with the invention; Fig. 2, a central longitudinal section of same on the dotted line 2 2 of Fig. 1; Fig. 3, a side elevation of the inner tube of the focimeter, said side bearing the scale for concave lenses. Fig. 4 is a like view of the opposite side of the inner tube of the focimeter, said side bearing the scale for convex lenses. Fig. 5 is an enlarged transverse section on the dotted line 5 5 of Fig. 6, said figure showing the application of a pair of spectacles into the focimeter; Fig. 6, a central longitudinal section through the focimeter, showing the parts on an enlarged scale, said figure being broken at three points for the purpose of bringing it within the required dimensions on the sheet of drawings; Fig. 7, an end view of the eye-piece of the focimeter; Fig. 8, a side elevation of one of the pockets which receives the lens either alone or framed which is to be tested; Fig. 9, a detached side elevation, partly in section, of the end of the focimeter; and Fig. 10, a transverse section of one of the pockets to receive the lens either alone or framed, said section being on the dotted line 10 10 of Fig. 8.

In the accompanying drawings, A indicates the outer tube; B, the inner sliding tube, and C a sliding tube or hood fitted upon the end of the outer tube and adapted to prevent the rays of light from entering the same during the operation of testing a lens.

The outer tube A is provided at its end with an eye-piece D, screwed therein and containing a double-concave lens, as shown more clearly in the enlarged view at Fig. 6. The tube A is also provided with the longitudinal slot E, which extends nearly the entire length of the tube and is traversed by and opens into the transverse slot F, located at a point adjacent to the eye-piece D. At the end of the tube A opposite to the eye-piece D is provided at opposite sides of the longitudinal slot E the apertures lettered G H, respectively.

The inner tube B is adapted to have a sliding movement within the tube A and is provided at its outer end with the double-concave lens I and upon its opposite sides with the scale of figures, (shown particularly in Figs. 3 and 4,) one of said scales being adapted for use in indicating the strength of concave lenses and the other for use in determining the strength of convex lenses. These scales for concave and convex lenses will preferably be painted directly upon the opposite sides of the inner tube B in such position that upon the longitudinal sliding movement of said tube B within the tube A the said figures will appear through the apertures G H formed in the outer end of the tube A.

The inner tube B is provided at about its center with the double-convex lens J and at its inner end with the four partitions L, forming between them the three compartments M N O, said partitions being provided with central apertures so as not to obstruct the vision through the tubes. Within the compartments M N O are provided the pockets P, one of which is illustrated in Figs. 8 and 10, detached from the tube B. The purpose of the pockets P is to receive the lens preparatory to their being tested; but in instances where the lens is framed and the pocket P is too small to receive said frame the pocket may then be withdrawn from its compartment and the framed lens then inserted directly into the compartment, the pocket being laid aside. The pocket P consists of the two plates Q R, open at their center, as shown in Fig. 8, and separated by the side pieces S, as shown by full lines in Fig. 10 and by dotted lines in Fig. 8. The space between the plates Q R is open at its upper end, as indicated in Figs. 5 and 8, to receive the lens with or without its inclosing-frame, and at the lower end of the pocket P the plate R is cut away, forming the slot T, which, upon a framed lens being inserted into the pocket, will receive the hinged projection of the same, as illustrated in Figs. 5 and 6, permitting the lens to be locked centrally within the tube B. Upon the side of the tube B, I provide a button V, of ordinary form, for the purpose of locking either or both of the pockets P within their respective compartments N O, as illustrated in Figs. 4 and 9.

In the use of the focimeter above described for testing convex lenses inclosed in spectacle-frames the inner tube B is first moved upward into the tube A until its compartment O is in line with the transverse slot F, formed in the outer tube, whereupon the spectacles will be inserted through the slot F into the said compartment O, the bridge of the frames being arranged in line with the longitudinal slot E, as shown in Fig. 5. As soon as the framed convex lens is in position the inner tube is drawn outward, carrying the lens with it, the slot E permitting the movement of the frame of the lens with the said tube, the person using the focimeter in the meantime watching an object or landscape through the eye-piece D. As soon as the inner tube B has been moved to such position that the landscape or object is rendered most clear, the movement of the inner tube will cease and the attendant observe the number on the convex scale, which will appear through the aperture G in the outer tube A, and this number will indicate the strength of the lens. The longitudinal slot E permits the movement of the inner tube B with the frame of the spectacles, and this is of great advantage, since without the slot E only such lens as were not framed could be tested. It will be apparent, however, that when it is desired to test lenses unframed the longitudinal slot E, although not made use of, will not interfere with this being done.

The convex scale embraces the indicating numbers for convex lenses, ranging from 2 to 144.

In testing concave lenses, the eye-piece lens being a one and one-half inch double concave, a No. 2 convex lens is inserted in the compartment O and the concave lens to be tested in the compartment N, after which the tube B will be moved in the tube A until the object or landscape observed through the tubes is clear, whereupon the tube B will be held stationary and the number on the scale for concave lenses appearing through the aperture H will denote the focus or strength of the lens. For concave lenses three sets of figures compose the scale, these ranging from 2 to 9, 10 to 28, and 30 to 144, as shown in Fig. 3. The use of a No. 2 convex lens in the compartment O gives a positive of $+1\frac{1}{4}$ inch incidental rays, which is to be considered in the calculations for concave or negative lenses, and this permits the accurate testing of the concave lens up to the numeral 10 on the concave scale.

If the concave lens to be tested has a focus greater than could be indicated clearly on the scale between the numerals 2 to 10, the No. 2 convex lens is withdrawn from the compartment O and a No. 8 convex lens inserted in its place, the concave lens being inserted in the compartment N, whereupon the tube B is moved as before until the object or landscape is clear, when the numeral on the scale between 10 and 28, which appears in the aperture H, will denote the focus or strength of the lens. The use of the No. 8 convex lens in the compartment O gives a positive of $+5''.25$ focus for incidental rays, and this carries the second division of the concave scale from $-10$ to $-28$, inclusive. When a No. 22 convex lens is substituted for the No. 8 convex lens in the compartment O, a result of $+9''.4$ focus for incidental rays is secured, and this carries the third division of the concave scale from $-30$ to $-144$, inclusive. The No. 2 convex auxiliary lens being placed in the compartment O adjacent to the concave lens to be tried, the incidental rays focus is found to be $1\frac{7}{8}''$ or $1''.875$, and this, applied to the formula for a No. $-9$, is $$\frac{-9 \times 1.875}{1.875 - 9} = \frac{-16.875}{-7.125} = 2''.3684$$

conjugate focus for $-9$. In this manner are all the other negative or concave foci calculated.

The calculation for the focal distances of convex lenses is based on the well-known principle in optics, that when the incidental rays focus is given the combined focus or conjugate focus can be determined by multiplying the length of the principal focus by the focus of the incident rays, and then dividing the product by the difference between the principal focus and the focus of the incident rays, the product will be equal to the conjugate focus.

If at any time it should be desired to verify the focus found for a concave lens by comparison with a convex lens—as in an instance, for example, where the scale indicates the focus of a concave lens to be No. 9 and a further verification of this focus is desired—I leave the concave lens in its pocket and place a No. 9 convex lens in the adjacent compartment M, and again view the object or landscape through the tubes. If upon this being done the vision is clear, it will indicate that the focus No. 9 given on the scale was correct. In this verification of concave lenses by comparison with convex lenses it will always be necessary to place in the compartment M a convex lens of the same number as that previously indicated on the scale as the focus of the concave lens being tested.

During the testing of the lenses it is desirable to exclude the rays of light as far as possible from entering through the slot F and adjacent end of the slot E, and with this end in view I provide the sliding tube or hood C, which may be slipped over the eye-piece end of the tube A and be moved over said slots after the tube B has carried the spectacle-frames outward.

What I claim as my invention, and desire to secure by Letters Patent, is—

1. The focimeter consisting of the outer tube having the eye-piece at one end and the inner sliding tube having at its inner end compartments for the lenses to be tested, at about its center the intermediate lens, at its outer end the lens, and upon its exterior surface the scales for the lenses, substantially as and for the purposes set forth.

2. The focimeter consisting of the outer tube having the eye-piece at one end, the transverse slot F, and longitudinal slot E, combined with the inner sliding tube B, containing the lens at its outer end, the intermediate lens at about its center, the compartments at its inner end to receive the lens to be tested, and the scales on its exterior surface to indicate the focus of the lens being tested, substantially as set forth.

3. The focimeter consisting of the outer tube having the eye-piece D at one end, the transverse slot F, longitudinal slot E, and apertures G H, combined with the inner sliding tube B, containing the lens at its outer end, the intermediate lens at about its center, the compartments at its inner end to receive the lenses, and the scales on its exterior surface in line with said apertures G H, substantially as set forth.

4. The focimeter consisting of the outer tube having the eye-piece at one end and provided with the slot F to admit the lenses, combined with the inner sliding tube B, carrying the lenses I J, and scales for convex and concave lenses, the inner end of said tube B containing compartments M N O open at their center, substantially as and for the purpose set forth.

5. The focimeter consisting of the outer tube having the eye-piece at one end and provided with the slot F to admit the lenses, combined with the inner sliding tube B, carrying the lenses I J, and scales for convex and concave lenses, the inner end of said tube B containing compartments provided with open pockets P, substantially as and for the purpose set forth.

Signed at New York, in the county of New York and State of New York, this 6th day of June, A. D. 1890.

PATRICK H. MAGUIRE.

Witnesses:
CHAS. C. GILL,
ED. D. MILLER.